(No Model.)  J. E. SMITH.  5 Sheets—Sheet 1.
CORN HARVESTER.

No. 305,975.  Patented Sept. 30, 1884.

WITNESSES:
Fred G. Dieterich
Edw. W. Byrn

INVENTOR:
Jno. E. Smith
BY Munn & Co.
ATTORNEYS.

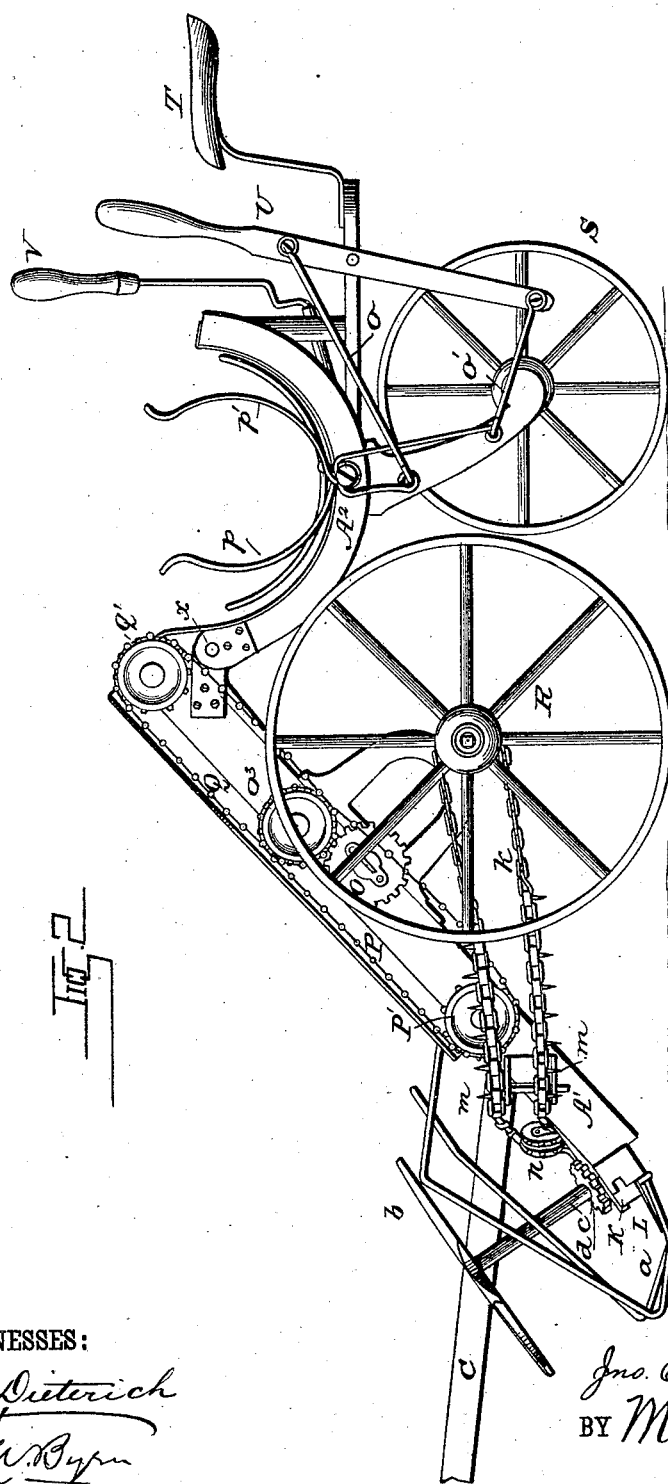

(No Model.)
J. E. SMITH.
CORN HARVESTER.
No. 305,975. Patented Sept. 30, 1884.
5 Sheets—Sheet 3.
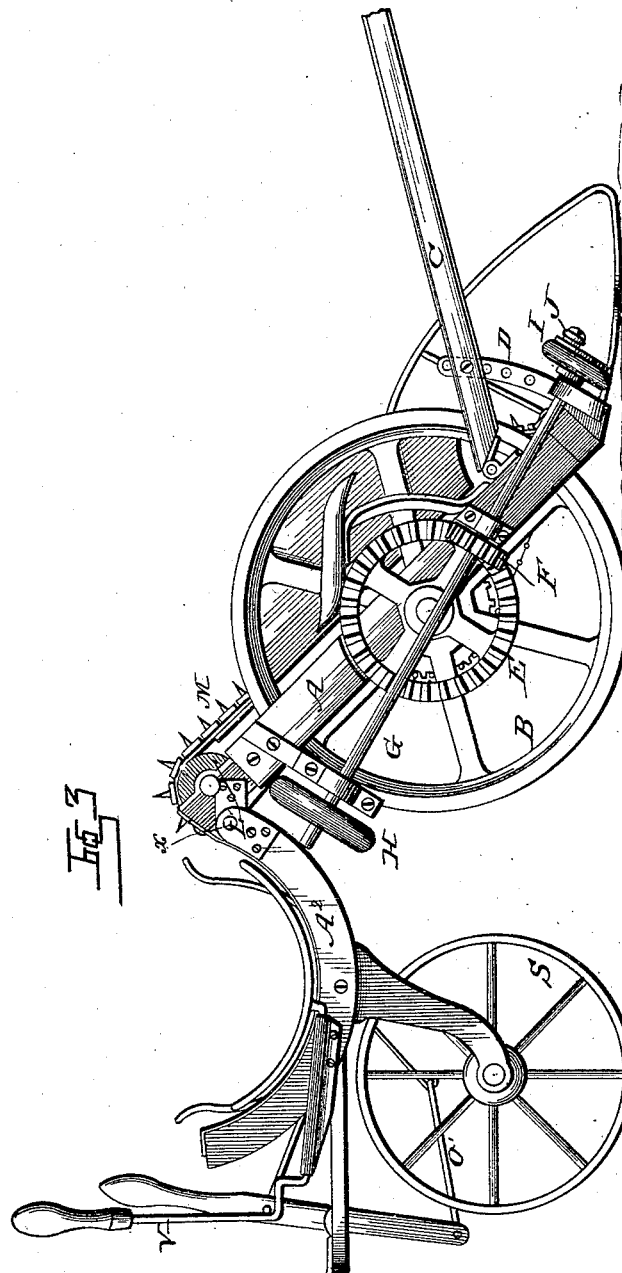

(No Model.)  
J. E. SMITH.  
CORN HARVESTER.  
No. 305,975. Patented Sept. 30, 1884.
5 Sheets—Sheet 4.
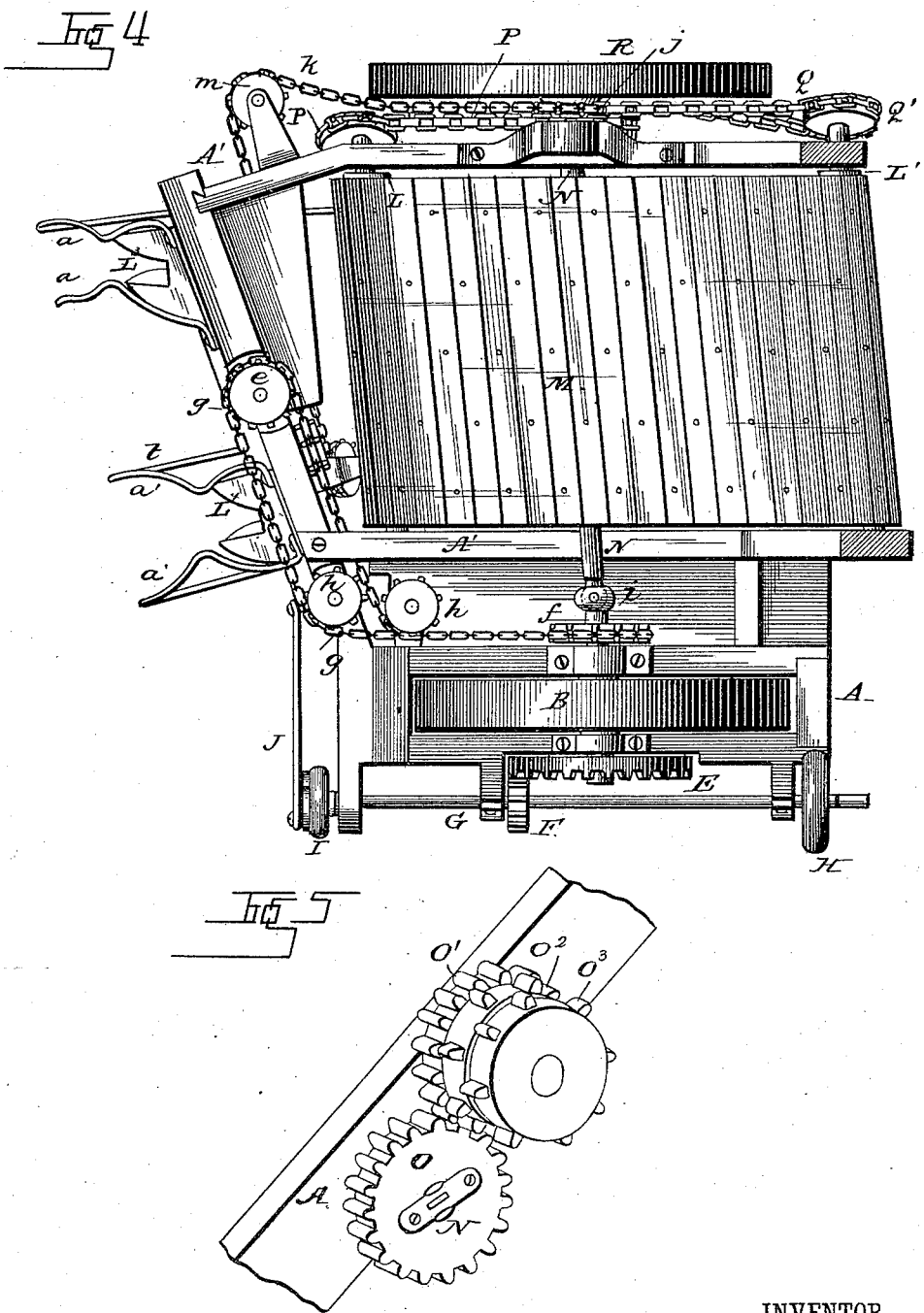

(No Model.)

5 Sheets—Sheet 5.

J. E. SMITH.
CORN HARVESTER.

No. 305,975. Patented Sept. 30, 1884.

WITNESSES:
Fred. G. Dieterich
Edw. W. Byrn

INVENTOR:
Jno. E. Smith
BY Munn & Co
ATTORNEYS.

UNITED STATES PATENT OFFICE.

JOHN EDWARD SMITH, OF WILMINGTON, DELAWARE.

CORN-HARVESTER.

SPECIFICATION forming part of Letters Patent No. 305,975, dated September 30, 1884.

Application filed August 30, 1883. (No model.)

*To all whom it may concern:*

Be it known that I, JOHN EDWARD SMITH, of Wilmington, in the county of Newcastle and State of Delaware, have invented a new and Improved Corn-Harvester; and I do hereby declare that the following is a full, clear, and exact description of the same, reference being had to the accompanying drawings, forming part of this specification, in which—

Figure 1:
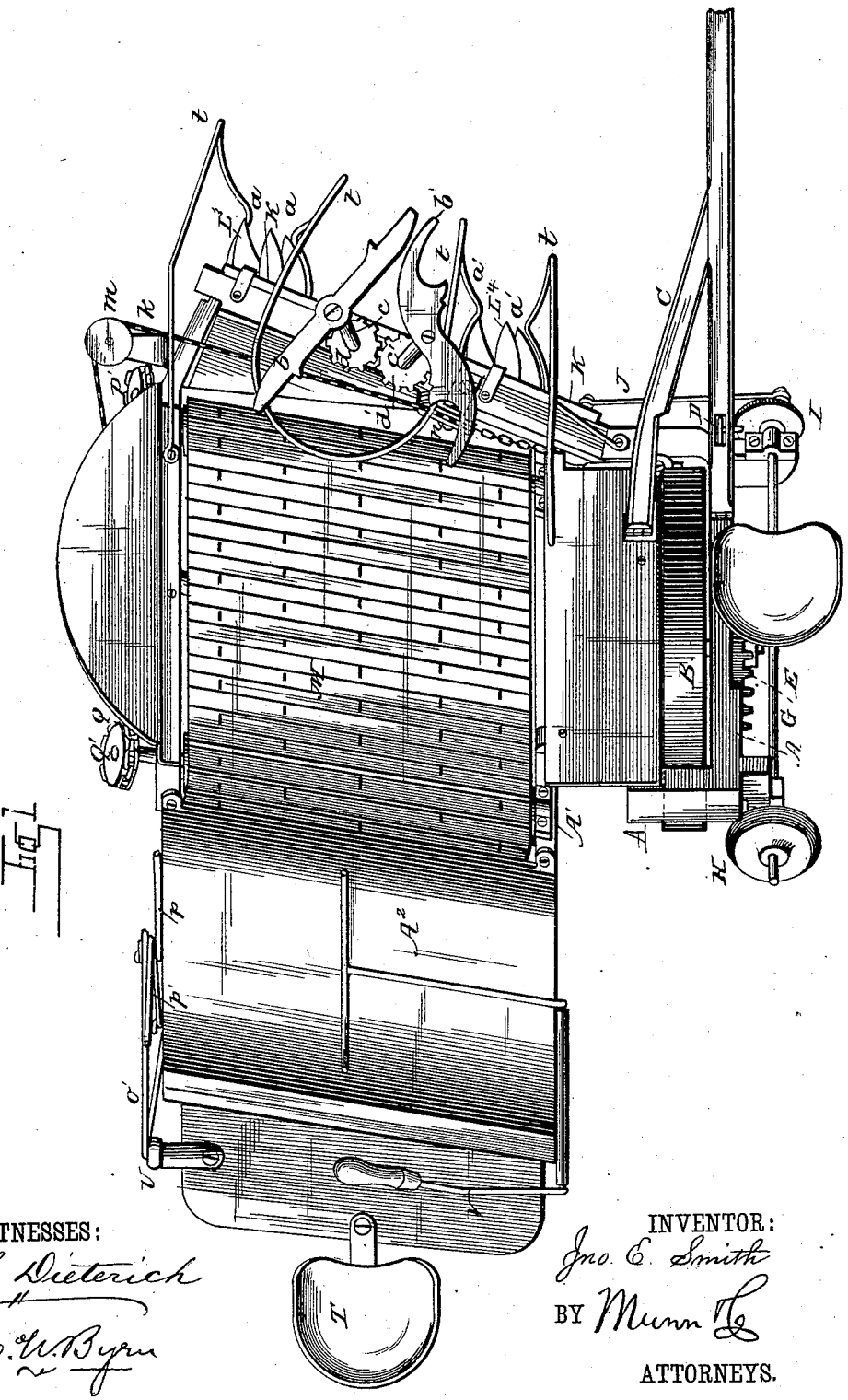
Figure 6:
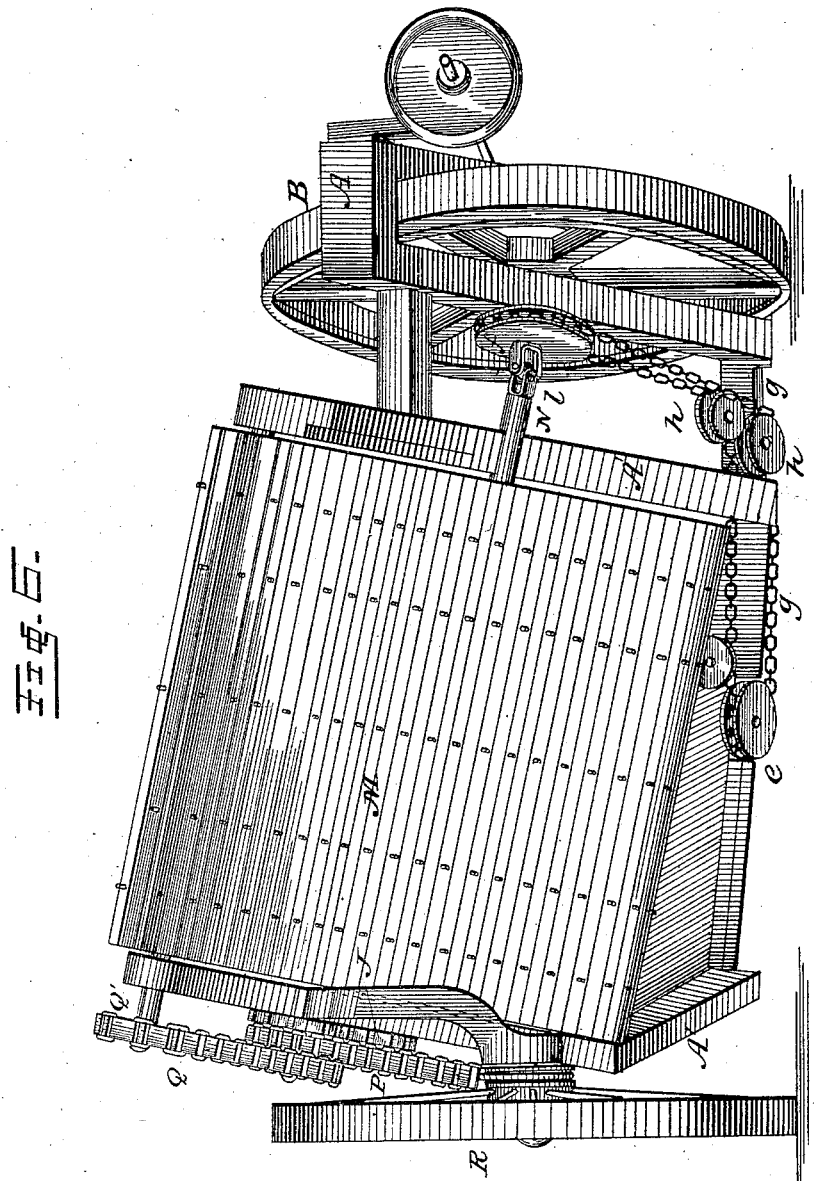

Figure 1 is a plan view of the device. Figs. 2 and 3 are side elevations from opposite sides. Fig. 4 is a plan view with parts of the device removed. Fig. 5 is a detail view, in perspective, of the gears for driving the elevator-apron, and Fig. 6 is a rear end elevation with the frame $A^2$ removed.

My invention relates to a novel construction of corn-harvester designed to be used for cutting corn, cane, or other analogous products. Its object is to save labor by doing with two men the usual work of fifteen or twenty men, and also to save acreage of ground under the present system of shocking corn by putting the shock-rows farther apart and the shocks closer together in the rows. It will also facilitate wheat-culture by enabling the farmer to quickly prepare his corn land for early seeding, as well as increase the corn-tillage and bring greater profit to the producer by cheapening the cost of harvesting.

Numerous forms of corn-harvesters have heretofore been constructed; but, so far as I know, none have been made practically successful.

My improvements, which look to the perfection of a practical construction, consist, mainly, in arranging the cutters to cut two rows of corn at one passage across the field, and placing the outer cutter, or one most remote from the team, in advance of the inner one, whereby a twofold result is reached, as hereinafter described.

It also consists in the combination, with the cutting devices, of an evener-chain for bringing the butt-ends of the two rows of stalks together as fast as they are cut, so that they can be bound together.

It also further consists in the peculiar construction and arrangement of revolving lifters and gatherers for raising the down corn and bringing it into favorable position for the knives, in the peculiar construction and arrangement of the devices for casting the shock after it is bound, and in the general organization of the machine, as hereinafter fully described.

In the drawings, A, Fig. 4, represents a rectangular inclined frame-work, in which is journaled the running wheel or driver B. To this frame is hinged the tongue C for the team, whose height is regulated by a perforated adjusting-bar, D, and a bolt passing through the same. Upon this frame is also mounted the driver's seat.

Attached to the shaft of the main wheel B, just outside the frame A, is a cog-wheel, E, Figs. 3 and 4, provided with crown-teeth with which engages a pinion, F, keyed rigidly upon an inclined shaft, G, which revolves in bearings offsetting from the main frame. This shaft carries at its upper and rear end a balance-wheel, H, and at its lower or front end a disk, I, with wrist-pin connecting with a pitman, J, which drives the cutter-bar.

Attached to the frame A, and projecting to one side of the same in a correspondingly inclined position, is the frame A', the forward end of which is near the ground, while the rear end is considerably elevated, and of which rear end the side next to the uncut corn or remote from the team is higher than the other, as shown in Fig. 6. The forward edge of this frame-work, instead of being at right angles to the line of draft, is inclined or arranged diagonally thereto, with the outer end or corner most remote from the tongue considerably in advance of the inner end. Near the outer end of this front bar is arranged a pair of fingers or guards, $a\,a$, Figs. 1 and 4, to receive one row of cornstalks, and near the inner end of this bar is another pair of guards or fingers, $a'\,a'$, to receive the other row of stalks. In front of this bar, and controlled by suitable guides thereto attached, is the reciprocating cutter-bar K, which carries a blade, $L^3\,L^4$, for each set of guards $a$ and $a'$. To one end of the cutter-bar is loosely connected, preferably by a ball-and-socket joint, the pitman J, which communicates the desired action to the cutter-bar whenever the machine is in motion.

Connected to the front bar of the frame A', on each side of the pairs of guards or fingers $a$ and $a'$, are stationary gatherers $t\ t$, which are in the nature of bent rods running down to a sharp bend or nose in front and extending backward and over the frame A', which gatherers serve to run under the down corn and raise it into the range of interrevolving lifters, which bring it up to the knives and deliver it, after being cut, upon an elevator-belt in the rear. These revolving lifters consist of straight arms $b$ on the outside and curved arms $b'$ on the inside, mounted upon the top of shafts $c\ c'$, Figs. 1 and 2, which incline forwardly and diverge from each other at the top, and are journaled in an offset from the front bar of the frame A'. These shafts revolve together by means of gears $d\ d'$, one of said shafts extending through its support and carrying a chain-wheel, $e$, Fig. 4, on the under side, which derives motion from the axle of main wheel B through the chain-wheel $f$ and chain $g$, which latter is guided around the corner by guide-pulleys $h\ h$.

The object in making the outer arms, $b$, straight is to allow the stalks to quickly fall away from them after being bent inwardly and cut, while the inner arms, $b'$, are made curved so as to hold onto the stocks of this row a longer time and throw the tops of the same over toward the tops of the row acted upon by arm $b$.

At the lower front portion of frame-work A', and also at the rear and higher portion of the same, there are journaled the belt-driving rollers L L', Fig. 4, around which passes the endless elevator belt or apron M, which is a carrier for the stalks, and which for this purpose has distributed over its surface projecting teeth or spurs to positively raise the said stalks. For driving this elevator-apron a shaft, N, is arranged in the middle of the length of said apron, and at one end is connected to the axle of the main drive-wheel B by means of a universal joint, $i$, and at the other end has a gear-wheel, O, Fig. 5, that imparts motion to a tripple-faced gear-wheel, O' O² O³. Of this tripple-faced gear-wheel two of its peripheries, O² and O³, are formed into chain-wheels, one of which, O², engages with a chain, P, Figs. 2 and 4, and drives the lower elevator-roller through its chain-wheel P', and the other periphery, O³, engages with a chain, Q, and drives the upper elevator-roller through its chain-wheel Q', thus driving the elevator-apron at both ends. The outer edge of the elevator-frame A' is sustained upon a running wheel, R, upon whose hub is formed a chain-pulley, $j$, around which passes a chain, $k$, that is provided throughout its length with spurs or teeth. This chain I call the "evener-chain," because it serves to take the butt-ends of the stalk cut in the row next to wheel R and carry them to the butt-ends of the stalks of the other row, laying them both in a practically even condition upon the elevator-belt. This evener-chain passes around corner pulleys, $m$, to the front of the machine, and extends in a line just back of the cutters to nearly the inner edge of the elevator-apron, where it is returned around a chain-wheel, $n$, Figs. 1 and 2, the direction of this chain being such as to carry the lower ends of the stalks lodging thereon inward to the main wheel B.

Depending from the upper edge of the elevator-frame A' is the half-round stalk-receptacle A², which is supported underneath by a caster or trailing wheel, S, which receptacle is connected to the said frame A' by an adjustable hinged joint, $x$, that permits the front of the machine carrying the cutters to be raised or lowered. Just back of this stalk-receptacle is a platform and seat, T, which is occupied by the man who binds the stalks into a shock. At one end of this platform is pivoted a hand-lever, U, which is jointed to a connecting-rod, $o$, above its fulcrum and another, $o'$, below its fulcrum.

At the end of the stalk-receptacle, and about the middle or lowest portion of the same, are pivoted two curved lever-arms or binder-clamps, $p\ p'$, which below their common fulcrum are jointed to the connecting-rods $o$ and $o'$. By deflecting the hand-lever U these curved arms are clamped about the tops of the cornstalks, and the latter are held compactly, so as to facilitate binding the same, which is effected by hand with a cord.

At the other end of the stalk-receptacle is a second hand-lever, V. This is pivoted in a bearing transversely to the stalk-receiver, and is then bent, and extends longitudinally up the middle of the stalk-receptacle to a point at or above the middle of the stalks, and then it terminates in T-shaped curved arms that lay underneath the bundle of stalks. After the stalks are properly bound, the shock is then cast from the receptacle by deflecting the said lever V, and as the butt-ends of the stalks are more or less spread out to form a base the shock will be delivered upon the ground upon said butt-ends, and remain standing in the field.

The operation of my machine is as follows: The machine is pulled across the field by the team with the two sets of cutting devices in line with the two rows of corn to be cut. The gatherers and lifters raise and guide the down corn to the knives, which cut the same diagonally with a shear cut, the cut corn being delivered by the revolving lifters upon the elevator-apron. As the outer set of cutting devices is in advance of the inner set, the inside row of corn is cut first and the butt-ends of this row, falling upon the evener-chain, are swung around toward the main drive-wheel B and laid upon the elevator-belt in the same relation as the stalks from the inner cutters, which are thrown by the curved arms with their butts to the main wheel and their tops to the outer edge of the apron in a somewhat inclined or diagonal position. The elevator-apron then taking the stalks delivers them into the half-round receptacle in the rear, where they are bound and then cast off by the devices before described.

With respect to arrangement of the cutter-bar in diagonal position, or obliquely to the line of draft, I would state that I am aware that this is not broadly new; but by placing two sets of cutting devices on said bar, and placing the outer end of the same in advance, I secure the following twofold result: first, the cutter-bar cuts two rows of corn, and yet acts only upon one hill of corn at a time, and by thus cutting the hills alternately renders the cutting-strain more uniform, and requires only in the machine a strength and power sufficient to cut one row; and secondly, by having the outer end of the cutter-bar in advance and cutting the inner row of corn first, this row is gotten out of the way first, and room obtained for the fall and movement of the corn from the outside row.

I am also aware that elevator-belts, corn-gatherers, and revolving arms have, in different combinations, been heretofore used, and that a corn-receiver has been placed in rear of the elevator-belts, and I only claim in regard to these features my particular construction and arrangement shown.

Having thus described my invention, what I claim as new is—

1. A corn-harvester having two sets of cutting devices for cutting two rows of corn at one passage, with the cutting devices on the outer end of the machine, or most remote from the team, arranged in advance of the inner set of cutting devices, substantially as and for the purpose described.

2. The combination, with two sets of cutting devices, and means for throwing the butts of the two rows together, of the shafts $c$ $c'$ and means for rotating them, the outer one of which shafts has straight arms $b$, and the inner one curved arms $b'$, to co-operate in throwing the butts and tops of the stalks together, as described.

3. The combination, with the two sets of cutting devices, of the shafts $c c'$, bearing revolving arms at the top, and inclined forwardly and divergently at the top with respect to each other, the two gears $d d'$, located on said shafts and meshing into each other, a chain-wheel on one of said shafts below the cutter-bar, and a chain connecting the same with the main driving-wheel, as shown and described.

4. The combination, with an elevator-belt and two sets of cutting devices for cutting two rows of corn, of an evener-chain or endless carrier running transversely to the elevator in front thereof, and adapted, as described, to carry the butts of one row to the butts of the other row.

5. The combination of the two frames A and A', the drive-wheel B, the gears E F, shaft G, disk and connecting-rod I J, the cutter-bar arranged diagonally to the line of draft, the inclined elevator-apron and its distending rollers, its shaft, with universal joint $i$, connecting with shaft of drive-wheel, and the chains and chain-wheels for operating said apron-rollers located upon the outer edge of the apron, substantially as shown and described.

6. The combination, with the corn-cutting devices and the inclined elevator-frame A' and elevator-apron, of a semicircular corn-receptacle located at the rear end of the elevator and hinged at $x$, and having a seat in the rear thereof, a supporting caster-wheel underneath the said receptacle, and means for clamping the corn and casting the shock, substantially as shown and described.

7. The combination, with the hollow or open corn-receiver, of the bent shock-casting lever, having its axis of movement arranged transversely to the receiver, and having its end extended longitudinally up the middle of said lever, and provided with bent T-shaped arms arranged transversely to and fitting in said receptacle, substantially as shown and described.

JOHN EDWARD SMITH.

Witnesses:
WM. MASSEY,
H. E. JARRELL.